US009699861B2

(12) United States Patent
Ohno

(10) Patent No.: US 9,699,861 B2
(45) Date of Patent: Jul. 4, 2017

(54) LIGHT EMITTING APPARATUS AND METHOD FOR CONTROLLING THE SAME

(71) Applicant: CANON KABUSHIKI KAISHA, Tokyo (JP)

(72) Inventor: Tomoyuki Ohno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 13/740,556

(22) Filed: Jan. 14, 2013

(65) Prior Publication Data

US 2013/0181612 A1 Jul. 18, 2013

(30) Foreign Application Priority Data

Jan. 18, 2012 (JP) ................................ 2012-007859

(51) Int. Cl.
*G09G 3/36* (2006.01)
*G06F 3/038* (2013.01)
(Continued)

(52) U.S. Cl.
CPC ........... *H05B 37/02* (2013.01); *G09G 3/3406* (2013.01); *H05B 33/086* (2013.01);
(Continued)

(58) Field of Classification Search
CPC ............ H05B 33/0689; H05B 33/0878; H05B 33/0869; H05B 33/0848; H05B 33/086;
(Continued)

(56) References Cited

U.S. PATENT DOCUMENTS 6,521,879 B1 * 2/2003 Rand .................... G09G 3/3406 250/205
8,059,085 B2 * 11/2011 Lee et al. ...................... 345/102
(Continued)

FOREIGN PATENT DOCUMENTS

CN 1841161 A 10/2006
CN 101083057 A 12/2007
(Continued)

OTHER PUBLICATIONS

Translation of JP2004146299A May 2004.*
(Continued)

*Primary Examiner* — Alexander H Taningco
*Assistant Examiner* — Renan Luque
(74) *Attorney, Agent, or Firm* — Cowan, Liebowitz & Latman, P.C.

(57) ABSTRACT

A light emitting apparatus having a plurality of light sources comprises a brightness sensor; a first malfunction detecting unit configured to detect any malfunction of each of the light sources; a second malfunction detecting unit configured to detect any malfunction of the brightness sensor; a storage unit configured to store a target value of a detected value of the brightness of each of the light sources; and a control unit configured to determine a light emission control value of each of the light sources so as to decrease a difference between the target value and the detected value of the brightness of each of the light sources; wherein the control unit allows the light emission control value to be set to a fixed value if the malfunction of at least any one of the light source and the brightness sensor is detected.

18 Claims, 9 Drawing Sheets

(51) Int. Cl.

| | |
|---|---|
| ***G09G 5/10*** | (2006.01) |
| ***H05B 37/02*** | (2006.01) |
| ***H05B 33/08*** | (2006.01) |
| ***G09G 3/34*** | (2006.01) |

(52) U.S. Cl.

CPC ............... *G09G 2320/0233* (2013.01); *G09G 2320/064* (2013.01); *G09G 2330/12* (2013.01); *G09G 2360/145* (2013.01)

(58) Field of Classification Search

CPC ....... H05B 33/0851; G09G 2320/0233; G09G 2320/064; G09G 2320/0646; G09G 2320/0666; G09G 2360/16; G09G 3/3413; G09G 2320/0653; G09G 2320/062; G09G 2360/14; G09G 2330/12; G09G 2310/0237; G09G 2310/024; G09G 2320/045; G09G 2320/0242; G09G 2320/048; G09G 2320/0686; G09G 2320/08; G09G 2360/147; G09G 5/10; G02F 2201/58; G02F 1/133611; G02F 2001/133601; G02F 1/13318

USPC ........ 315/151, 297, 291, 307; 345/204, 207, 345/102, 690

See application file for complete search history.

(56) References Cited

U.S. PATENT DOCUMENTS

| | | | | |
|---|---|---|---|---|
| 8,599,223 | B2 * | 12/2013 | Hasegawa et al. | 345/690 |
| 2001/0035853 | A1 * | 11/2001 | Hoelen | G02F 1/133603 345/102 |
| 2005/0259064 | A1 * | 11/2005 | Sugino | G09G 3/342 345/102 |
| 2008/0088573 | A1 * | 4/2008 | Kim | 345/102 |
| 2008/0094347 | A1 * | 4/2008 | Lee et al. | 345/102 |
| 2008/0238860 | A1 | 10/2008 | Onodera | |
| 2009/0016060 | A1 * | 1/2009 | Nakao | G02F 1/133603 362/276 |
| 2009/0153464 | A1 * | 6/2009 | Furukawa | G02F 1/133603 345/102 |
| 2010/0007577 | A1 * | 1/2010 | Ninan | H04N 9/3102 345/1.3 |
| 2011/0037786 | A1 * | 2/2011 | Hasegawa et al. | 345/690 |
| 2012/0050606 | A1 * | 3/2012 | Debevec | G03B 15/07 348/370 |
| 2012/0212467 | A1 * | 8/2012 | Kohtoku | 345/207 |
| 2013/0057518 | A1 * | 3/2013 | Sugita et al. | 345/175 |
| 2013/0278578 | A1 * | 10/2013 | Vetsuypens et al. | 345/207 |

FOREIGN PATENT DOCUMENTS

| | | | | |
|---|---|---|---|---|
| CN | 101161036 | A | | 4/2008 |
| CN | 101199000 | A | | 6/2008 |
| CN | 102097046 | A | | 6/2011 |
| JP | 2004-146299 | A | | 5/2004 |
| JP | 2004146299 | A | * | 5/2004 |
| JP | 2004-163479 | A | | 6/2004 |
| JP | 2006-031977 | | | 2/2006 |
| JP | 2006-031977 | A | | 2/2006 |
| JP | 2007-108519 | A | | 4/2007 |
| JP | 2008-298834 | | | 12/2008 |

OTHER PUBLICATIONS

The above patent documents were cited in the Aug. 14, 2014 Chinese Office Action, which is enclosed with an English Translation, that issued in Chinese Patent Application No. 201310019667.1.

The above foreign patent documents were cited in the Dec. 8, 2015 Japanese Office Action, which is enclosed without an English Translation, that issued in Japanese Patent Application No. 2012-007859.

The above foreign patent documents were cited in the Dec. 1, 2016 Chinese Office Action, which is unclosed without an English Translation, that issued in Chinese Patent Application No. 201510253917.7.

* cited by examiner

| | PWM CONTROL VALUE |
|---|---|
| LED(1) | 1999 |
| LED(2) | 1980 |
| LED(3) | 1989 |

Fig.3A

| | PWM CONTROL VALUE |
|---|---|
| LED(1) | 2999 |
| LED(2) | 2970 |
| LED(3) | 2988 |

Fig.3B

| | SENSOR VALUE |
|---|---|
| BRIGHTNESS SENSOR (1) | 1980 |
| BRIGHTNESS SENSOR (2) | 1975 |
| BRIGHTNESS SENSOR (3) | 1984 |

Fig.3C

| | SENSOR VALUE |
|---|---|
| BRIGHTNESS SENSOR (1) | 2995 |
| BRIGHTNESS SENSOR (2) | 2987 |
| BRIGHTNESS SENSOR (3) | 2984 |

Fig.3D

INITIAL PWM CONTROL VALUE

| | R | G | B |
|---|---|---|---|
| LED1 (R,G,B) | 1000 | 1100 | 1050 |
| LED2 (R,G,B) | 1002 | 1090 | 1040 |
| LED3 (R,G,B) | 998 | 1082 | 1045 |

*Fig.9A*

BL SENSOR IS OUT OF ORDER

LED 3 (G) IS OUT OF ORDER

PWM CONTROL VALUE TRANSMITTED TO LIGHT EMISSION AMOUNT CONTROL UNIT 118

| R | G | B |
|---|---|---|
| 1000 | 1100 | 1050 |
| 1002 | 1090 | 1040 |
| 998 | 1082 | 1045 |

*Fig.9B*

| R | G | B |
|---|---|---|
| 1000 | 1100 | 1050 |
| 1002 | 1090 | 1040 |
| 998 | 0 | 1045 |

*Fig.9C*

| R | G | B |
|---|---|---|
| 1000 | 1100 | 1050 |
| 1002 | 1090 | 1040 |
| 0 | 0 | 0 |

*Fig.9D*

LIGHT EMITTING APPARATUS AND METHOD FOR CONTROLLING THE SAME

BACKGROUND OF THE INVENTION

Field of the Invention

The present invention relates to a liquid crystal display apparatus and a method for controlling the same.

Description of the Related Art

The demand of the market, which is directed to the brightness and the color reproduction performance in relation to the display apparatus based on the use of the liquid crystal panel, is highly sophisticated and diversified. The light emitting diode (LED), which is excellent in the light emission efficiency as compared with the cold cathode fluorescent lamp, is also used in many cases as the light source for the backlight of the liquid crystal display apparatus.

The light emission characteristic of LED is sometimes changed depending on, for example, the individual difference upon the production, the change of the environmental temperature during the use, and the time-dependent change during the process of use. When LED is used as a light source of a backlight of a liquid crystal display apparatus, any difference sometimes arises in the brightness of LED, for example, between the upper side and the lower side of a screen on account of the temperature distribution in the apparatus.

Japanese Patent Application Laid-open No. 2006-031977 discloses a backlight control technique in order to reduce the dispersion of the backlight luminance in the screen as described above. In the case of the technique described in Japanese Patent Application Laid-open No. 2006-031977, a luminance sensor and a temperature sensor are arranged in the vicinity of LED, and the light emission amount of LED is adjusted on the basis of a detected value of the luminance (luminance sensor value) and a detected value of the temperature (temperature sensor value) obtained by these sensors.

SUMMARY OF THE INVENTION

The brightness sensor (luminance sensor) and the temperature sensor (hereinafter generally referred to as "BL sensor" in some cases) and LED are sometimes out of order due to the aging deterioration and/or any other factor.

According to the LED light emission amount control for the backlight based on the use of the BL sensor, if part of LED or LEDs is/are out of order and not subjected to the lighting, the control is allowed to act such that the light emission amount or amounts of LED or LEDs disposed therearound is/are increased in order to supplement the light emission amount or amounts of defective (malfunctioning) LED or LEDs by means of LED or LEDs disposed therearound. On the other hand, if the BL sensor is out of order and any normal sensor value cannot be acquired, then the control may be possibly allowed to act such that the light emission amount or amounts of LED or LEDs is/are unnecessarily increased. When the backlight has the protective function against the overheat and/or the protective function against the overcurrent (excess current), if LED is continuously subjected to the lighting (turned ON) at a highlight emission amount, then the control may be possibly allowed to act such that the backlight is subjected to the blackout (turned OFF) in order to effect the protection against the overheat and/or the protection against the overcurrent.

If the liquid crystal display apparatus suddenly cannot be used due to the blackout of the backlight caused by the protection against the temperature and/or the protective function against the overcurrent, it is impossible to continuously perform the operation of a user of the apparatus. For example, when the liquid crystal display apparatus is used while being connected to PC (personal computer), a problem arises such that it is impossible to adequately perform the process for storing any document in the editing operation and the process for shutting down PC.

The present invention relates to a light emitting apparatus having brightness sensors and a plurality of light sources, in which light emission of each of the light sources is controlled on the basis of a detected value detected by the brightness sensor, wherein it is intended that the apparatus can be continuously used for a certain period of time even when part of the light sources and/or the brightness sensor or brightness sensors is/are out of order.

A first aspect of the present invention resides in a light emitting apparatus having a plurality of light sources for which light emission is controllable independently from each other, the light emitting apparatus comprising:

a brightness sensor which detects a brightness of each of the light sources;

a first malfunction detecting unit configured to detect any malfunction of each of the light sources;

a second malfunction detecting unit configured to detect any malfunction of the brightness sensor;

a storage unit configured to store a target value of a detected value of the brightness of each of the light sources to be detected by the brightness sensor; and a control unit configured to determine a light emission control value of each of the light sources so as to decrease a difference between the target value and the detected value of the brightness of each of the light sources detected by the brightness sensor, wherein:

the control unit allows the light emission control value of each of the light sources to be set to a fixed value regardless of the difference between the target value and the detected value detected by the brightness sensor if the malfunction of at least any one of the light source and the brightness sensor is detected.

A second aspect of the present invention resides in a method for controlling a light emitting apparatus having a plurality of light sources for which light emission is controllable independently from each other, the method for controlling the light emitting apparatus comprising:

a step of detecting a brightness of each of the light sources by means of a brightness sensor;

a step of detecting any malfunction of each of the light sources;

a step of detecting any malfunction of the brightness sensor; and a control step of determining a light emission control value of each of the light sources so as to decrease a difference between a target value of a detected value of the brightness of each of the light sources to be detected by the brightness sensor and the detected value of the brightness of each of the light sources detected by the brightness sensor, the target value being stored in a storage unit, wherein:

the light emission control value of each of the light sources is allowed to be set to a fixed value in the control step regardless of the difference between the target value and the detected value detected by the brightness sensor if the malfunction of at least any one of the light source and the brightness sensor is detected.

According to the present invention, the apparatus can be continuously used for a certain period of time even when part of the light sources and/or the brightness sensor or brightness sensors is/are out of order in relation to the light emitting apparatus having the brightness sensors and the plurality of light sources, in which light emission of each of the light sources is controlled on the basis of the detected value detected by the brightness sensor.

Further features of the present invention will become apparent from the following description of exemplary embodiments with reference to the attached drawings.

BRIEF DESCRIPTION OF THE DRAWINGS

FIG. 3 shows examples of reference PWM control data and target brightness sensor value data (target luminance sensor value data) according to the embodiment. FIG. 3A shows an example of reference PWM control data provided when the brightness (luminance) of the liquid crystal display apparatus is 100 cd/$m^2$. FIG. 3B shows an example of reference PWM control data provided when the brightness of the liquid crystal display apparatus is 200 cd/$m^2$. FIG. 3C shows an example of target brightness sensor value data provided when the brightness of the liquid crystal display apparatus is 100 cd/$m^2$. FIG. 3D shows an example of target brightness sensor value data provided when the brightness of the liquid crystal display apparatus is 200 cd/$m^2$.

FIG. 6 shows exemplary operation flows to determine any malfunction of a brightness sensor (luminance sensor) and a temperature sensor according to the embodiment.

FIG. 9 shows examples of determination of PWM control values according to a third embodiment. FIG. 9A shows exemplary initial PWM control values of a backlight provided with three sets of combinations of red LEDs, green LEDs, and blue LEDs as light sources. FIG. 9B shows PWM control values transmitted by a light emission amount determining unit to a light emission amount control unit when any malfunction of BL sensor is detected. FIG. 9C shows PWM control values transmitted by the light emission amount determining unit to the light emission amount control unit when any malfunction of green LED of LED is detected. FIG. 9D shows PWM control values provided when PWM control values of LEDs of other colors for constructing the white color together with malfunctioning LED are also “0”.

DESCRIPTION OF THE EMBODIMENTS

An embodiment of the present invention will be explained below with reference to the drawings.

(First Embodiment)

A first embodiment is such an example that the present invention is applied to a backlight apparatus (light emitting apparatus) which is based on the use of white LEDs as light sources and which is provided with brightness sensors for detecting the brightnesses of the white LEDs and temperature sensors for detecting the temperatures around the white LEDs (hereinafter generally referred to as “BL sensors” in some cases).

Figure 1:
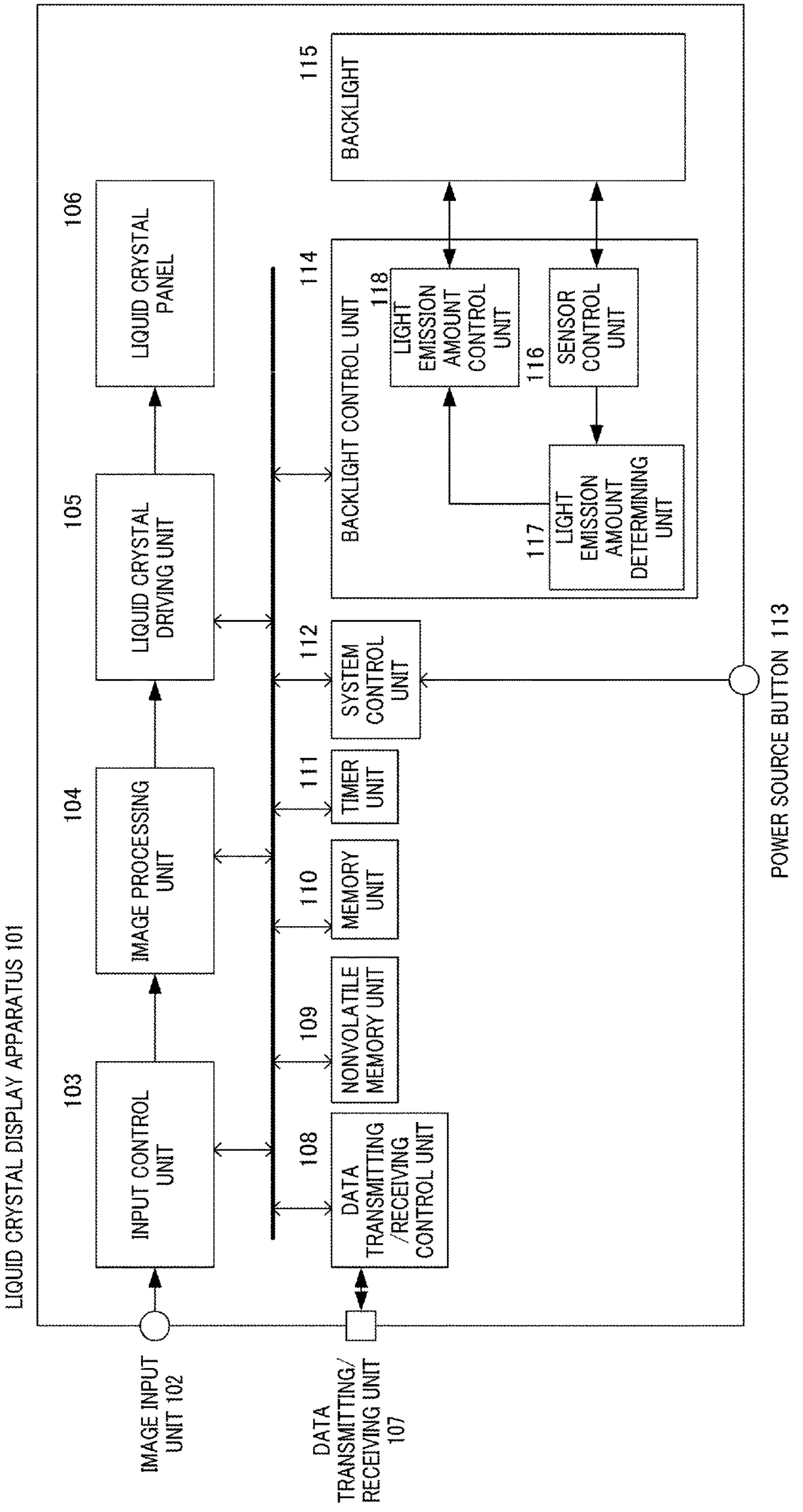
FIG. 1 shows a block diagram illustrating main constitutive components of a liquid crystal display apparatus according to an embodiment.

FIG. 1 shows a block diagram illustrating main constitutive components of a liquid crystal display apparatus having the backlight apparatus according to the first embodiment of the present invention.

The liquid crystal display apparatus 101 shown in FIG. 1 is composed of an image input unit 102, an input control unit 103, an image processing unit 104, a liquid crystal driving unit 105, a liquid crystal panel 106, a data transmitting/receiving unit 107, a data transmitting/receiving control unit 108, a nonvolatile memory unit 109, a memory unit 110, a timer unit 111, a system control unit 112, a power source button 113, a backlight control unit 114, and a backlight 115. Further, the backlight control unit 114 is composed of a sensor control unit 116, a light emission amount determining unit 117, and a light emission amount control unit 118. The internal construction of the backlight 115 will be described later on.

An explanation will be made below about the functions possessed by the respective blocks.

(About Basic Image Display Function of Liquid Crystal Display Apparatus 101)

When the system control unit 112 detects the request for turning ON the power source by depressing the power source button 113, the electric power application is started for the respective blocks included in the liquid crystal display apparatus 101.

An image signal, which is inputted from the image input unit 102, is transmitted by the input control unit 103 to the image processing unit 104.

The image processing unit 104 converts the inputted image signal into the display data which is suitable for the number of display colors and the display resolution (number of pixels) of the liquid crystal panel 106, and the data is transmitted to the liquid crystal driving unit 105 at the timing which is suitable for the refresh rate of the liquid crystal panel 106.

The data, which is received from the image processing unit 104, is converted by the liquid crystal driving unit 105 into the control signal for the liquid crystal panel 106, and the control signal is outputted to the liquid crystal panel 106.

The liquid crystal panel 106 is driven in accordance with the control signal inputted from the liquid crystal driving unit 105, and thus the image, which is based on the image signal, is displayed.

Further, the system control unit 112 makes the request for starting the backlight lighting control with respect to the backlight control unit 114 to turn ON the backlight 115. The operation of the backlight control unit 114 will be described later on.

(About Backlight)

The backlight 115 is provided on the back surface of the liquid crystal panel 106, and the light is radiated from the back surface of the liquid crystal panel 106. The backlight 115 is provided with a plurality of white LEDs as light sources for which light emission is controllable independently from each other.

Figure 2:
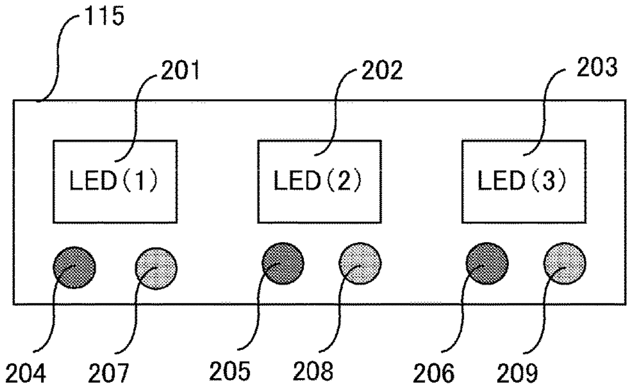
FIG. 2 shows an exemplary arrangement of LEDs and BL sensors in a backlight according to the embodiment.

FIG. 2 shows an exemplary arrangement of LEDs and BL sensors provided at the inside of the backlight 115. In this embodiment, as shown in FIG. 2, the backlight 115 is provided with three LEDs, i.e., LED (1) 201, LED (2) 202, and LED (3) 203. Further, a brightness sensor (1) 204, a brightness sensor (2) 205, and a brightness sensor (3) 206 are provided to detect the brightnesses of respective LEDs. Further, a temperature sensor (1) 207, a temperature sensor (2) 208, and a temperature sensor (3) 209 are arranged to detect the temperatures around respective LEDs. This embodiment is explained as exemplified by such a case that the backlight 115 has three LEDs and three BL sensors by way of example. However, the numbers of LEDs and BL sensors are not limited to the foregoing numbers. For example, it is also allowable to provide such a construction that 500 LEDs and 500 BL sensors are provided, or it is also allowable to provide such a construction that 1000 LEDs and 1000 BL sensors are provided.

The light emission is controlled by the light emission amount control unit 118 for LED (1) 201, LED (2) 202, LED (3) 203 respectively. The light emission amount control unit 118 determines the current amounts allowed to flow to respective LEDs on the basis of the light emission data inputted from the light emission amount determining unit 117. The light emission amount control unit 118 controls the light emission of each of LEDs in accordance with the PWM (Pulse Width Modulation) control on the basis of the inputted light emission data. In this embodiment, it is assumed that the light emission control value (hereinafter referred to as "PWM control value"), which is inputted from the light emission amount determining unit 117, is a value of 0 to 4095, and the light emission amount control unit 118 performs the PWM control in which the light emission amount of LED can be controlled at 4096 levels. For example, when the PWM control value is 0, then the current amount is 0, and LED does not emit light. When the PWM control value is 4095, then the current amount is maximized, and LED emits light at the maximum brightness.

The brightness sensor (1) 204 and the temperature sensor (1) 207 are arranged in the vicinity of LED (1) 201 to detect the brightness and the temperature in the vicinity of LED (1) 201 respectively. The brightness sensor (2) 205 and the temperature sensor (2) 208 are arranged in the vicinity of LED (2) 202 to detect the brightness and the temperature in the vicinity of LED (2) 202 respectively. The brightness sensor (3) 206 and the temperature sensor (3) 209 are arranged in the vicinity of LED (3) 203 to detect the brightness and the temperature in the vicinity of LED (3) 203 respectively. An AD converter of 12-bit accuracy is contained in each of the brightness sensor and the temperature sensor. Each of the brightness sensors outputs the detected brightness as the brightness sensor value of 0 to 4095 to the sensor control unit 116. Each of the temperature sensors outputs the detected temperature as the temperature sensor value of 0 to 4095 to the sensor control unit 116.

(Operation of Backlight Control Unit 114)

Next, an explanation will be made about the lighting control of the backlight 115 performed by the backlight control unit 114.

The nonvolatile memory unit 109 of the liquid crystal display apparatus 101 stores table data (reference PWM control data) which correlates the brightness value of the backlight and the PWM control value of each of LEDs with each other. Further, the nonvolatile memory unit 109 stores table data (target brightness sensor value data) which correlates the brightness value of the backlight and the target brightness sensor value of each of the brightness sensors with each other.

The reference PWM control data resides in the PWM control value which is determined for each of the light sources so that the dispersion of the brightness in the display screen is within a predetermined allowable level at a specified environmental temperature, upon the shipping adjustment performed in the factory of the liquid crystal display apparatus 101. The reference PWM control data is the data of the PWM control value which is finally inputted into each of LEDs when the light emission amount of each of LEDs is adjusted so that the dispersion of the brightness is decreased in the light emission plane of the backlight while performing the measurement by using an unillustrated external apparatus. The reference PWM control data is prepared for various backlight brightnesses. The liquid crystal display apparatus 101 receives the prepared reference PWM control data by means of the data transmitting/receiving control unit 108 by the aid of the data transmitting/receiving unit 107 from the external apparatus, and the data is stored in the nonvolatile memory unit 109.

The target brightness sensor value data is prepared when the reference PWM control data is prepared as described above. The detected value (brightness sensor value), which is to be detected by each of the brightness sensors in such a state that each of LEDs emits the light with the PWM control value so as to minimize the brightness difference in the display screen, is designated as the target brightness sensor value data as the target value of the detected value to be detected by the brightness sensor. The target brightness sensor value data is prepared for various backlight brightnesses in the same manner as the reference PWM control data. The liquid crystal display apparatus 101 receives the prepared target brightness sensor value data by means of the data transmitting/receiving control unit 108 by the aid of the data transmitting/receiving unit 107, and the data is stored in the nonvolatile memory unit 109.

The liquid crystal display apparatus 101 of this embodiment stores the reference PWM control data and the target brightness sensor value data at intervals of every 20 cd/$m^2$ within a range of the backlight brightness value of 20 to 200 cd/$m^2$. That is, the reference PWM control data includes the data of the PWM control value at which the brightness difference in the display screen is minimized (dispersion in the light emission plane is not more than the allowable level), in relation to the ten types of the brightness values of the backlight respectively. Further, the target brightness sensor value data includes the data of the brightness sensor value which is to be outputted by each of the brightness sensors in such a state that each of LEDs emits the light at the PWM control value so as to minimize the brightness difference in the display screen (allow the dispersion in the light emission plane to be not more than the allowable level), in relation to the ten types of the brightness values respectively.

FIG. 3 shows examples of the reference PWM control data and the target brightness sensor value data.

FIG. 3A shows an example of the reference PWM control data provided when the brightness of the liquid crystal display apparatus 101 is 100 cd/$m^2$.

FIG. 3B shows an example of the reference PWM control data provided when the brightness of the liquid crystal display apparatus 101 is 200 cd/$m^2$.

FIG. 3C shows an example of the target brightness sensor value data provided when the brightness of the liquid crystal display apparatus 101 is 100 cd/$m^2$.

FIG. 3D shows an example of the target brightness sensor value data provided when the brightness of the liquid crystal display apparatus 101 is 200 cd/$m^2$.

Figure 4:
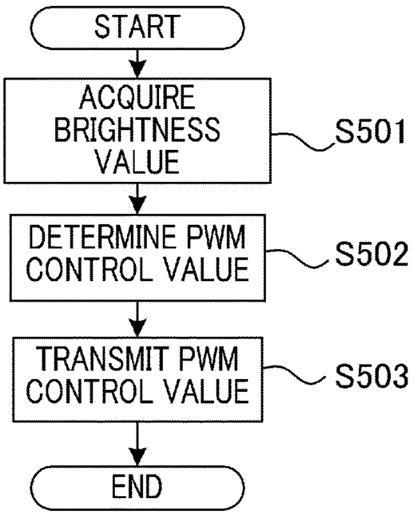
FIG. 4 shows an exemplary operation flow of a backlight control unit according to the embodiment.

FIG. 4 shows an exemplary operation flow of the backlight control unit 114 upon the start of the backlight lighting control.

In S501 shown in FIG. 4, if the light emission amount determining unit 117 of the backlight control unit 114 accepts the request for starting the lighting control from the system control unit 112, the light emission amount determining unit 117 acquires the brightness value information of the backlight stored in the nonvolatile memory unit 109.

In S502, the light emission amount determining unit 117 acquires the reference PWM control data stored in the nonvolatile memory unit 109 on the basis of the brightness value information acquired in S501. For example, if the brightness value information is "100 cd/$m^2$", the light emission amount determining unit 117 acquires the reference PWM control data shown in FIG. 3A. If the brightness value information is "200 cd/$m^2$", the light emission amount determining unit 117 acquires the reference PWM control data shown in FIG. 3B. If the brightness value information is "150 cd/$m^2$", the light emission amount determining unit 117 acquires two pieces of the reference PWM control data shown in FIGS. 3A and 3B.

In S502, the light emission amount determining unit 117 determines the PWM control value for each of LEDs by making reference to the reference PWM control data acquired from the nonvolatile memory unit 109. If the brightness value information is "100 cd/$m^2$", the light emission amount determining unit 117 makes reference to the reference PWM control data shown in the FIG. 3A so that the PWM control value for each of LEDs is determined to be "1999" for LED (1) 201, "1980" for LED (2) 202, and "1989" for LED (3) 203. If the brightness value information is "150 cd/$m^2$", the light emission amount determining unit 117 makes reference to two pieces of the reference PWM control data shown in FIGS. 3A and 3B so that the PWM control value for each of LEDs is calculated in accordance with the linear interpolation. For example, the PWM control value for LED (2) 202 is determined to be "2475" in accordance with the calculation of 1980+(2970−1980)/2. The PWM control value for each of LEDs determined in S502 is stored in the memory unit 110 as "initial PWM control value" which is the initial control value.

In S503, the light emission amount determining unit 117 transmits the determined PWM control value of each of LEDs to the light emission amount control unit 118. The light emission amount control unit 118 performs the PWM control for each of LEDs on the basis of the inputted PWM control value.

The backlight 115 starts the lighting in accordance with the operation as described above.

If a user of the liquid crystal display apparatus requests to change the brightness of the liquid crystal display apparatus, the PWM control value for each of LEDs, which corresponds to the brightness after the concerning change, is determined in accordance with a process which is approximately the same as that of the operation flow shown in FIG. 4.

Next, an explanation will be made about a process of the backlight control unit 114 as executed every certain (constant) cycle after the start of the lighting of the backlight 115. The cycle of the execution of this process is counted by the timer unit 111, and the system control unit 112 requests the backlight control unit 114 to execute the process.

Figure 5:
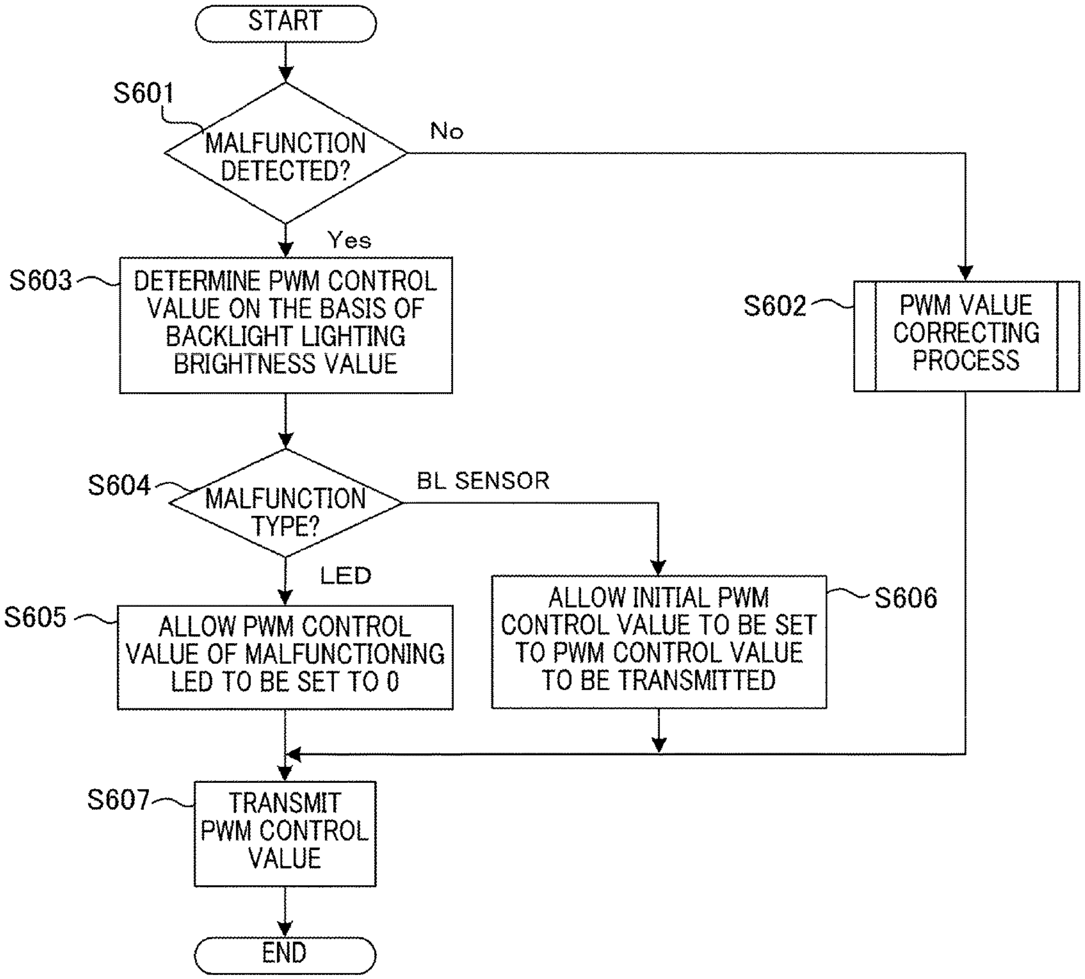
FIG. 5 shows an exemplary operation flow of the backlight control unit according to the embodiment.

FIG. 5 shows an exemplary operation flow of the backlight control unit 114 after the start of the lighting of the backlight as the point of the present invention. The process, which is illustrated by the flow chart shown in FIG. 5, is periodically executed by the backlight control unit 114.

In S601 shown in FIG. 5, the light emission amount determining unit 117 performs the first malfunction detection by determining whether or not any malfunction arises in LED on the basis of the malfunction detection information supplied from the light emission amount control unit 118. Further, the light emission amount determining unit 117 performs the second malfunction detection (brightness sensor) and the third malfunction detection (temperature sensor) by determining whether or not any malfunction arises in the BL sensor on the basis of the malfunction detection information supplied from the sensor control unit 116. The malfunction detection information, which is acquired from the sensor control unit 116, includes the information about the presence or absence of the malfunction of the BL sensor and the information about which one of the brightness sensors 204 to 206 and the temperature sensors 207 to 209 is out of order if any malfunction arises. Further, the malfunction detection information, which is acquired from the light emission amount control unit 118, includes the information about the presence or absence of the malfunction of LED and the information about which one of LED (1) 201, LED (2) 202, LED (3) 203 is out of order if any malfunction arises. If the malfunction is detected in any one of the BL sensors and LEDs, the process proceeds to S603. If the malfunction is not detected in any one of them, the process proceeds to S602.

An explanation will now be made by using the drawings about the malfunction determining process for the BL sensor performed by the sensor control unit 116 and the malfunction determining process for LED performed by the light emission amount control unit 118.

Figure 6A:
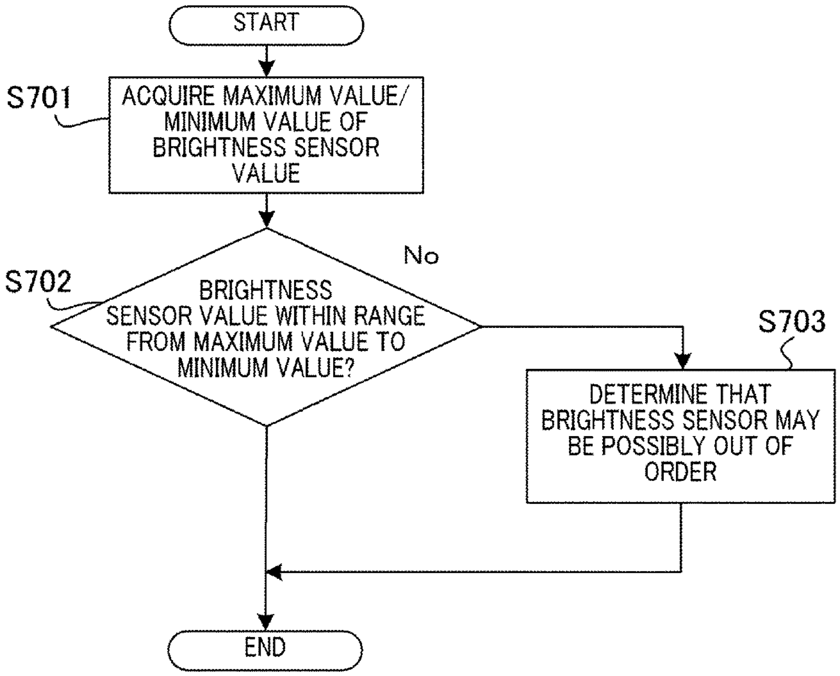
FIG. 6A shows an exemplary operation flow to determine the presence or absence of any malfunction of the brightness sensor by a sensor control unit.
Figure 6B:
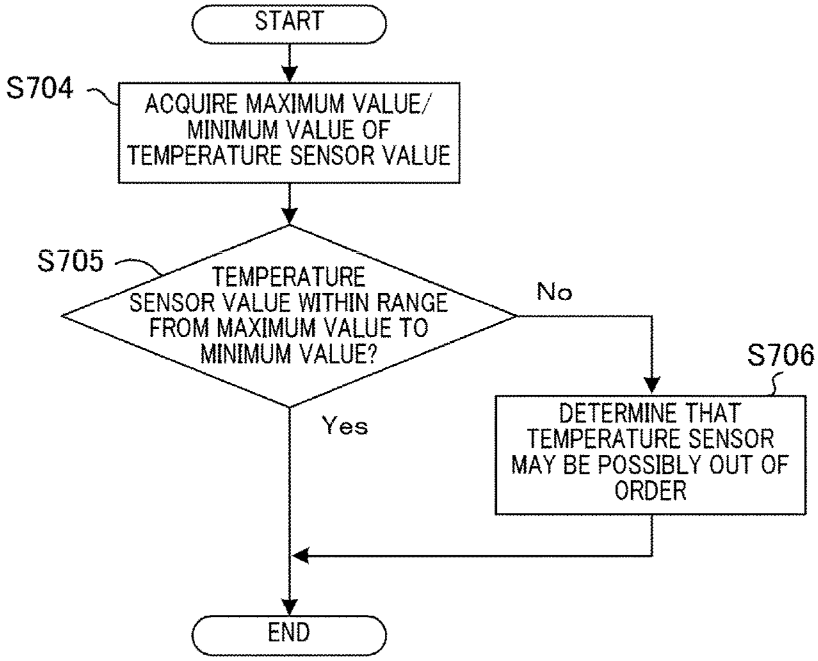
FIG. 6B shows an exemplary operation flow to determine any malfunction of the temperature sensor by the sensor control unit.
Figure 7:
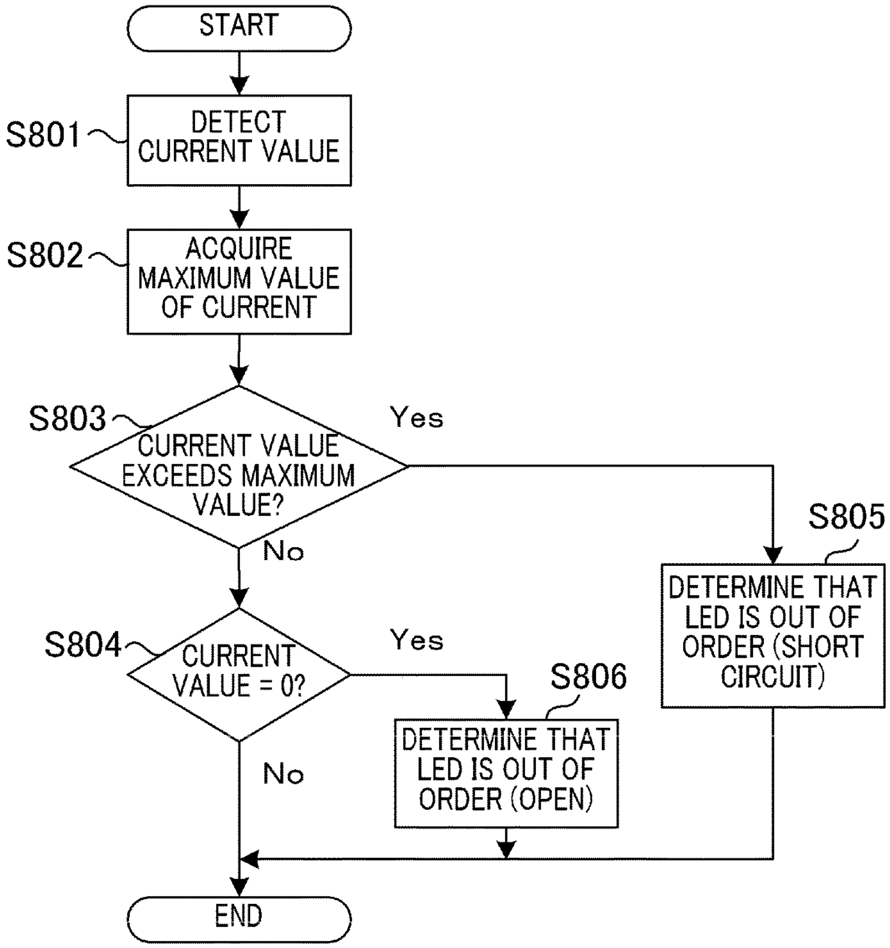
FIG. 7 shows an exemplary operation flow to determine any malfunction of LED according to the embodiment.

FIG. 6A shows an exemplary operation flow to determine the presence or absence of any malfunction of the brightness sensor by the sensor control unit 116. FIG. 6B shows an exemplary operation flow to determine any malfunction of the temperature sensor by the sensor control unit 116. FIG. 7 shows an operation flow to determine any malfunction of LED by the light emission amount control unit 118.

In S701 shown in FIG. 6A, the sensor control unit 116 acquires the information of the maximum value and the minimum value of the brightness sensor value capable of being outputted by the brightness sensor, from the nonvolatile memory unit 109. The information of the maximum value and the minimum value of the brightness sensor value is previously determined, and the information is stored in the nonvolatile memory unit 109 upon the shipping adjustment performed in the factory.

In S702, the sensor control unit 116 determines whether or not the brightness sensor value, which is acquired during the lighting of the backlight 115, is a value within a range from the minimum value to the maximum value of the brightness sensor value acquired in S701. If the brightness sensor value is within the range, the sensor control unit 116 completes the malfunction determination flow. If the brightness sensor value is not within the range, the sensor control unit 116 determines that the brightness sensor is out of order (S703).

The sensor control unit 116 executes the operation flow shown in FIG. 6A for each of the brightness sensors.

In S704 shown in FIG. 6B, the sensor control unit 116 acquires the information of the maximum value and the minimum value of the temperature sensor value capable of being outputted by the temperature sensor, from the nonvolatile memory unit 109. The information of the maximum value and the minimum value of the temperature sensor value is previously determined, and the information is stored in the nonvolatile memory unit 109 upon the shipping adjustment performed in the factory.

In S705, the sensor control unit 116 determines whether or not the temperature sensor value, which is acquired during the lighting of the backlight 115, is a value within a range from the minimum value to the maximum value of the temperature sensor value acquired in S704. If the temperature sensor value is within the range, the sensor control unit 116 completes the malfunction determination flow. If the temperature sensor value is not within the range, the sensor control unit 116 determines that the temperature sensor is out of order (S706).

The sensor control unit 116 executes the operation flow shown in FIG. 6B for each of the temperature sensors.

In S801 shown in FIG. 7, the light emission amount control unit 118 detects the current value allowed to flow through LED. Any general method is used to detect the current value, for example, such that the electric potential difference is detected across a resistor formed on the wiring line through which the current is allowed to flow.

In S802, the light emission amount control unit 118 acquires the information of the maximum value of the current value capable of flowing through LED, from the nonvolatile memory unit 109. The information of the maximum value of the current value is previously determined, and the information is stored in the nonvolatile memory unit 109 upon the shipping adjustment performed in the factory.

In S803, the light emission amount control unit 118 determines whether or not the current value detected in S801 exceeds the maximum value of the current value acquired in S802. Ifthe current value exceeds the maximum value, then the process proceeds to S805, and the light emission amount control unit 118 determines that the LED is in short circuit and out of order. If the current value does not exceed the maximum value, the process proceeds to S804 to perform the determination by the light emission amount control unit 118.

In S804, the light emission amount control unit 118 determines whether or not the current value detected in S801 is 0. In this procedure, it is assumed that the light emission amount control unit 118 determines that the current value is 0 if the difference between the current value and 0 is smaller than a threshold value. If the current value is 0, then the process proceeds to S806, and the light emission amount control unit 118 determines that LED is open and out of order. If the current value is not 0, the light emission amount control unit 118 completes the malfunction determination flow.

The light emission amount control unit 118 executes the operation flow shown in FIG. 7 for each of LEDs.

The malfunction determining process for the BL sensor performed by the sensor control unit 116 and the malfunction determining process for LED performed by the light emission amount control unit 118 have been described above.

With reference to FIG. 5 again, in S602, the light emission amount determining unit 117 of the backlight control unit 114 corrects the PWM control value on the basis of the brightness sensor value and the temperature sensor value acquired from the sensor control unit 116. This correcting process is the process for correcting the drift of the brightness in order that the brightness distribution in the light emission plane of the backlight, which is caused, for example, by the temperature distribution in the apparatus, is reduced.

Figure 8:
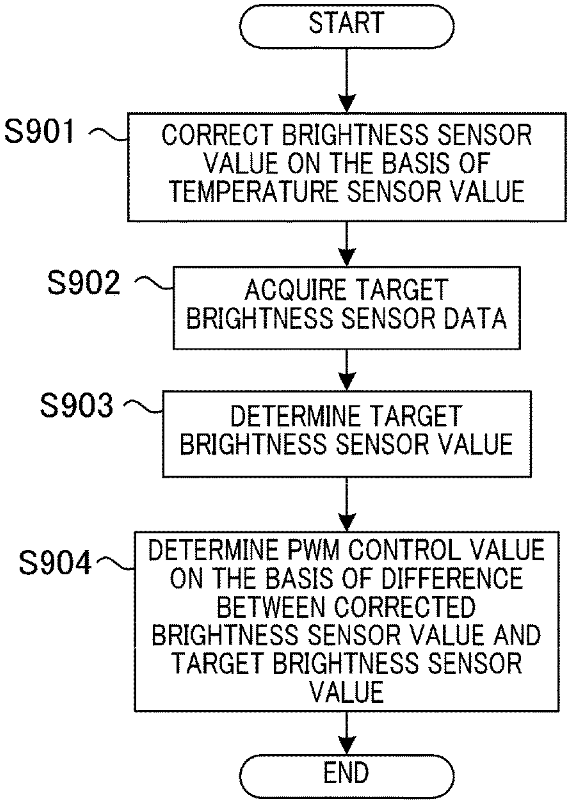
FIG. 8 shows an exemplary operation flow of the backlight control unit according to the embodiment.

FIG. 8 shows an exemplary operation flow of the correcting process for the PWM control value in S602.

In S901, the light emission amount determining unit 117 corrects the brightness sensor value acquired from the sensor control unit 116 on the basis of the temperature characteristic of LED on the basis of the temperature sensor value acquired as well to determine the corrected brightness sensor value as the value after the correction. The relationship between the detected value obtained by the temperature sensor and the light emission characteristic depending on the temperature of LED is stored beforehand in the nonvolatile memory unit 109. In this correction, the calculation is performed to convert the present brightness sensor value into the brightness value at the concerning environmental temperature while considering the light emission characteristic of LED at the specified environmental temperature provided when the target brightness sensor value data is prepared as described above and the present temperature sensor value acquired by the temperature sensor.

In S902, the light emission amount determining unit 117 acquires, from the nonvolatile memory unit 109, the target brightness sensor value data corresponding to the information of the brightness value of the backlight. For example, if the brightness value information is "100 cd/$m^2$", the light emission amount determining unit 117 acquires the target brightness sensor value data shown in FIG. 3C. If the brightness value information is "200 cd/$m^2$", the light emission amount determining unit 117 acquires the target brightness sensor value data shown in FIG. 3D. If the brightness value information is "150 cd/$m^2$", the light emission amount determining unit 117 acquires two pieces of the target brightness sensor value data shown in FIGS. 3C and 3D.

In S903, the light emission amount determining unit 117 determines the target brightness sensor value for each of the brightness sensors on the basis of the target brightness sensor value data acquired from the nonvolatile memory unit 109. If the brightness value information is "100 cd/$m^2$", the light emission amount determining unit 117 makes reference to the target brightness sensor value data shown in FIG. 3C so that the target brightness sensor value is determined to be "1980" for the brightness sensor (1) 204, "1975" for the brightness sensor (2) 205, and "1984" for the brightness sensor (3) 206. If the brightness value information is "150 cd/$m^2$", the light emission amount determining unit 117 makes reference to two pieces of the target brightness sensor value data shown in FIGS. 3C and 3D so that the target brightness sensor value is calculated in accordance with the linear interpolation. For example, the target brightness sensor value for the brightness sensor (2) 205 is determined to be "2481" in accordance with the calculation of 1975+(2987−1975)/2.

In S904, the light emission amount determining unit 117 determines the PWM control value to be transmitted to the light emission amount control unit 118 on the basis of the difference between the corrected brightness sensor value determined in S901 and the target brightness sensor value determined in S903. The light emission amount determining unit 117 stores, in the memory unit 110, the PWM control value determined in this process as "corrected PWM control value". For example, if the corrected brightness sensor value is smaller than the target brightness sensor value, the light emission amount determining unit 117 increases the PWM control value as compared with the present value so that LED is subjected to the lighting brighter than the present situation. On the other hand, if the corrected brightness sensor value is larger than the target brightness sensor value, the light emission amount determining unit 117 decreases the PWM control value as compared with the present value so that LED is subjected to the lighting darker than the present situation.

In this way, if LED and the BL sensor are not out of order, the PWM value correcting process in S602 is repeatedly executed. Accordingly, the lighting state of the backlight is maintained, wherein the dispersion is reduced for the temperature characteristic and the light emission characteristic of LED which would be otherwise caused by the temperature change in the apparatus and the dispersion is reduced for the brightness in the light emission plane of the backlight 115 which would be otherwise caused, for example, by the time-dependent change of LED.

On the other hand, in S603 shown in FIG. 5, the light emission amount determining unit 117 determines the initial PWM control value on the basis of the brightness value information of the backlight stored in the nonvolatile memory unit 109 without performing the PWM value correcting process in S602. The process for determining the initial PWM control value is the same as or equivalent to that of the operation flow upon the start of the backlight lighting control shown in FIG. 4, any explanation of which is omitted.

In S604, the light emission amount determining unit 117 determines which one of the BL sensor and LED is out of order on the basis of the information supplied from the sensor control unit 116 and the light emission amount control unit 118. If it is determined that LED is out of order, the process proceeds to S605. If it is determined that the BL sensor is out of order, the process proceeds to S606.

In S605, the light emission amount determining unit 117 is operated as follows. That is, the PWM control value corresponding to the malfunctioning LED is set to zero (0), and the PWM control values corresponding to the other LEDs are set to the initial PWM control values determined in S603, the values being determined as the PWM control values to be transmitted to the light emission amount control unit 118. For example, if LED (2) 202 is out of order during the lighting with the brightness value information of "100 cd/m$^2$", then the PWM control value of LED (1) 201 is determined to be "1999", the PWM control value of LED (2) 202 is determined to be "0", and the PWM control value of LED (3) 203 is determined to be "1989".

In S606, the light emission amount determining unit 117 determines the initial PWM control value determined in S603 as the PWM control value to be transmitted to the light emission amount control unit 118.

In S607, the light emission amount determining unit 117 transmits the PWM control value determined in S605 or S606 to the light emission amount control unit 118, and the light emission amount control unit 118 performs the PWM control for respective LEDs on the basis of the PWM control values.

In accordance with the operation as described above, if any malfunction of LED is detected, the malfunctioning LED is in the non-lighting state. If any malfunction of the BL sensor is detected, LED continues the lighting on the basis of the initial PWM control value.

If any malfunction of LED or the BL sensor is detected, then the drift correcting process for the brightness, which is based on the present temperature sensor value and the brightness sensor value as explained in S602, is not performed, and the value is fixed to the default PWM control value (initial PWM control value) corresponding to the brightness value of the backlight. That is, the PWM control value of each of the light sources is set to the fixed value. Therefore, if any malfunction of LED is especially detected, the control is not performed such that the PWM control value is increased so as to compensate the brightness in an amount corresponding to the malfunctioning LED, with respect to LEDs disposed around the malfunctioning LED. Therefore, it is possible to avoid the failure of continuous use of the liquid crystal display apparatus by the user, which would be otherwise caused by such situations that any excess current continuously flows through LED disposed around malfunctioning LED, LED and the liquid crystal display apparatus are excessively heated thereby, and the backlight undergoes the blackout on account of the function to effect the protection from the overheat and the protection from the overcurrent.

As described above, in this embodiment, if LED or the BL sensor is out of order, the PWM control value, which is to be transmitted to the light emission amount control unit 118, is fixed to the initial PWM control value (if LED is out of order, the PWM control value corresponding to the malfunctioning LED is set to "0").

However, if LED or the BL sensor is out of order, the PWM control value, which is to be transmitted to the light emission amount control unit 118, may be fixed to the PWM control value having been transmitted to the light emission amount control unit 118 at the point in time at which it is determined that the multifunction arises. That is, it is also allowable that the value is fixed to the PWM control value determined in S602 of the flow chart shown in FIG. 5 executed immediately before it is determined that the LED or the BL sensor is out of order (corrected PWM control value determined in S904 of the flow chart shown in FIG. 8). If LED is out of order, then the PWM control value corresponding to malfunctioning LED is set to "0" in relation to the corrected PWM control value in the same manner as in the foregoing embodiment, and the other values are fixed to the corrected PWM control values determined immediately before the determination of the malfunction. The "corrected PWM control value" is the PWM control value corrected by performing the process shown in FIG. 5 not less than once, which is stored in the nonvolatile memory unit 109. If the malfunction of any one of the BL sensor and LED is detected, it is possible to use the PWM control value stored in the nonvolatile memory unit 109 before the malfunction is detected.

In the foregoing embodiment, the exemplary case of the backlight has been described, in which the white light source composed of white LED is used. However, the present invention is also applicable to a backlight based on the use of a white light source composed of LEDs of a plurality of colors. For example, the present invention is also applicable to a case of a backlight in which LEDs of three colors of R (red), G (green), and B (blue) are used. In this case, it is assumed that the light emission amount control unit 118 is capable of independently controlling the light emission of LEDs of the respective colors, and the light emission amount control unit 118 is capable of detecting the malfunction of LEDs of the respective colors.

FIG. 9A shows exemplary initial PWM control values of a backlight provided with three sets of combinations of red LEDs, green LEDs, and blue LEDs as light sources. The initial PWM control value is previously determined depending on the brightness value of the backlight in the same manner as in the foregoing embodiment, and the initial PWM control value is stored in the memory unit 110.

FIG. 9B shows PWM control values to be transmitted by the light emission amount determining unit 117 to the light emission amount control unit 118 if any malfunction of the BL sensor is detected. As shown in FIG. 9B, if the BL sensor is out of order, the light emission amount determining unit 117 determines the initial PWM control value stored in the memory unit 110 as the PWM control value to be transmitted to the light emission amount control unit 118.

FIG. 9C shows PWM control values to be transmitted by the light emission amount determining unit 117 to the light emission amount control unit 118 if any malfunction of green LED (LED 3 (G)) of LED 3 is detected. As shown in FIG. 9C, if LED 3 (G) is out of order, the light emission amount determining unit 117 determines that the value is set to "0" for only the malfunctioning LED 3 (G) and the values are set to the initial PWM control values for those other than the malfunctioning light source, the values being determined as the PWM control values to be transmitted to the light emission amount control unit 118.

As shown in FIG. 9D, it is also appropriate that the PWM control values of LEDs of the other colors for constructing the white color together with the malfunctioning LED are also set to "0". In the case of the example shown in FIG. 9D, the PWM control values of the red LED of LED 3 and the blue LED of LED 3 are also set to "0" in addition to the malfunctioning LED 3 (G).

When one light emission unit of the backlight is composed of one red LED, two green LEDs, and one blue LED, if only one of the two green LEDs is out of order, then the following procedure is also available. That is, the PWM control value of the malfunctioning green LED may be set to "0", and the PWM control value may be increased for the PWM control value of the green LED which is not out of order.

The foregoing respective embodiments are illustrative of the exemplary case in which the PWM control value of the malfunctioning LED is set to 0. However, the present invention is characterized in that the PWM control values of LEDs other than the malfunctioning LED are set to the fixed values. Any arbitrary PWM control value may be inputted for the malfunctioning LED, and the value is not limited to 0. However, when a white light source is constructed by LEDs of a plurality of colors, the PWM control values are set to 0 for all of the light sources for constructing the white light source together with the malfunctioning LED. Accordingly, it is possible to suppress any deviation of the white balance. Further, this embodiment is illustrative of the exemplary case in which the brightness sensor and the temperature sensor are provided for each of LEDs. However, the brightness sensor and the temperature sensor may be provided at such a rate that one brightness sensor and one temperature sensor are provided for a plurality of LEDs. It is also allowable that the number of the brightness sensor or brightness sensors is not identical with the number of the temperature sensor or temperature sensors. When one brightness sensor is provided for a plurality of LEDs, if one LED is out of order, then the output of the brightness sensor corresponding to the concerning LED is greatly lowered, and the PWM control values of other LEDs subjected to the feedback control on the basis of the output of the concerning brightness sensor are greatly increased.

According to the present invention, even in the case of the situation as described above, the values are fixed to the initial PWM control values or the corrected PWM control values provided immediately before the malfunction for LEDs other than malfunctioning LED, and the feedback control is stopped. Therefore, it is possible to suppress, for example, any unnecessary overheat of LEDs disposed around the malfunctioning LED.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-007859, filed on Jan. 18, 2012, which is hereby incorporated by reference herein in its entirety.

What is claimed is:

1. A light emitting apparatus having a plurality of light sources for which light emission is controllable independently from each other, the light emitting apparatus comprising:

a brightness sensor which detects a brightness of at least one of the plurality of light sources;

a first detecting unit configured to detect any malfunction of each of the light sources;

a second detecting unit configured to detect any malfunction of the brightness sensor;

a storage unit configured to store a target value of a detected value of the brightness of each of the light sources to be detected by the brightness sensor; and a control unit configured to determine a light emission control value of each of the light sources so as to decrease a difference between the target value and the detected value of the brightness of each of the light sources detected by the brightness sensor, wherein:

the control unit allows the light emission control value of each of the light sources to be set to a fixed value regardless of the difference between the target value and the detected value detected by the brightness sensor if the malfunction of at least any one of the light source and the brightness sensor is detected.

2. The light emitting apparatus according to claim 1, wherein:

the storage unit stores, as an initial control value, the light emission control value previously determined for each of the light sources so that a dispersion of the brightness in a light emission plane of the light emitting apparatus is within a predetermined allowable level; and the control unit allows the light emission control values of the light sources other than the malfunctioning light source to be set to the initial control values if the malfunction of the light source is detected.

3. The light emitting apparatus according to claim 1, wherein:

the storage unit stores the light emission control value of each of the light sources determined by the control unit; and the control unit allows the light emission control values of the light sources other than the malfunctioning light source to be set to the light emission control values determined by the control unit before the malfunction is detected if the malfunction of the light source is detected.

4. The light emitting apparatus according to claim 1, wherein:

the storage unit stores, as an initial control value, the light emission control value previously determined for each of the light sources so that a dispersion of the brightness in a light emission plane of the light emitting apparatus is within a predetermined allowable level; and the control unit allows the light emission control values of the respective light sources to be set to the initial control values if the malfunction of the brightness sensor is detected.

5. The light emitting apparatus according to claim 1, wherein:

the storage unit stores the light emission control value of each of the light sources determined by the control unit; and the control unit allows the light emission control values of the respective light sources to be set to the light emission control values determined by the control unit before the malfunction is detected if the malfunction of the brightness sensor is detected.

6. The light emitting apparatus according to claim 1, wherein:

each of the light sources is a white light source composed of light elements of a plurality of colors for which light emission is controllable independently from each other;

the storage unit stores, as an initial control value, the light emission control value previously determined for each of the light elements so that a dispersion of the brightness in a light emission plane of the light emitting apparatus is within a predetermined allowable level;

the first detecting unit is configured to detect any malfunction of the light element for constructing each of the white light sources; and the control unit is operated, if the malfunction of at least one light element of the light elements for constructing each of the white light sources is detected, such that the light emission control values of the malfunctioning light element and all of the light elements other than the malfunctioning light element for constructing the white light source including the malfunctioning light element are allowed to be set to zero, and the light emission control values of the light elements for constructing the other white light sources are allowed to be set to the initial control values.

7. The light emitting apparatus according to claim 1, wherein:

each of the light sources is a white light source composed of light elements of a plurality of colors for which light emission is controllable independently from each other;

the storage unit stores the light emission control value of each of the light elements determined by the control unit;

the first detecting unit is configured to detect any malfunction of the light element for constructing each of the white light sources; and the control unit is operated, if the malfunction of at least one light element of the light elements for constructing each of the white light sources is detected, such that the light emission control values of all of the light elements for constructing the white light source together with the malfunctioning light element are allowed to be set to zero, and the light emission control values of the light elements for constructing the other white light sources are allowed to be set to the light emission control values determined by the control unit before the malfunction is detected.

8. The light emitting apparatus according to claim 1, further comprising:

a temperature sensor which detects a temperature around each of the light sources; and a third detecting unit configured to detect any malfunction of the temperature sensor, wherein:

the storage unit stores a relationship between the temperature around the light source and a light emission characteristic of the light source;

the control unit corrects the detected value of the brightness of each of the light sources detected by the brightness sensor on the basis of the temperature around each of the light sources detected by the temperature sensor and the relationship to determine the light emission control value of each of the light sources so that a difference between the target value and the detected value after the correction is decreased; and the control unit allows the light emission control value of each of the light sources to be set to the fixed value regardless of the difference between the target value and the detected value after the correction if the malfunction of at least any one of the light source, the brightness sensor, and the temperature sensor is detected.

9. A light emitting apparatus comprising:

a plurality of light sources;

a brightness sensor which detects a brightness of at least one of the plurality of light sources;

a detecting unit configured to detect malfunction of at least any one of the light source and the brightness sensor;

a storage unit configured to store a target value for a detected value of the brightness of each of the light sources to be detected by the brightness sensor; and a control unit configured to determine a control value of each of the plurality of light sources so as to decrease a difference between the target value and the detected value of the brightness sensor, wherein:

in a case where the detecting unit detects the malfunction, the control unit determines the control value of each of the plurality of light sources to a fixed value regardless of the difference between the target value and the detected value detected by the brightness sensor; and the storage unit stores an initial control value of each of the plurality of light sources, which is the control value previously determined for each of the light sources so that a dispersion of the brightness in a light emission plane of the light emitting apparatus is within a predetermined allowable level; and in a case where the detecting unit detects the malfunction of the brightness sensor, the control unit controls the control values of respective light sources to the initial control values of the respective light sources of which the brightness sensor detects brightnesses.

10. A light emitting apparatus having a plurality of light sources for which light emission is controllable independently from each other, the light emitting apparatus comprising:

a brightness sensor which detects a brightness of at least one of the plurality of light sources;

a detecting unit configured to detect malfunction of at least any one of the light source and the brightness sensor;

a storage unit configured to store a target value for a detected value of the brightness of each of the light sources to be detected by the brightness sensor; and a control unit configured to perform a correcting process in which a light emission control value of each of the light sources is determined so as to decrease a difference between the target value and the detected value of the brightness of each of the light sources detected by the brightness sensor, wherein:

the control unit is operated, in response to the malfunction of at least any one of the light source and the brightness sensor being detected, such that the correcting process is not performed.

11. A method for controlling a light emitting apparatus having a plurality of light sources for which light emission is controllable independently from each other, the method for controlling the light emitting apparatus comprising:

a step of detecting a brightness of at least one of the plurality of light sources by means of a brightness sensor;

a detecting step of detecting malfunction of at least any one of the light source and the brightness sensor; and a control step of performing a correcting process in which a light emission control value of each of the light sources is determined so as to decrease a difference between a target value for a detected value of the brightness of each of the light sources to be detected by the brightness sensor and the detected value of the brightness of each of the light sources detected by the brightness sensor, the target value being stored in a storage unit, wherein:

the correcting process is not performed in the control step in response to the malfunction of at least any one of the light source and the brightness sensor being detected.

12. The light emitting apparatus according to claim 10, wherein:

the storage unit stores an initial control value of each of the plurality of light sources, which is the light emission control value previously determined for each of the light sources so that a dispersion of the brightness in a light emission plane of the light emitting apparatus is within a predetermined allowable level; and in a case where the detecting unit detects the malfunction of a first light source among the plurality of light sources, the control unit determines the light emission control value of each of second light sources to the initial control value of each of the second light sources, the second light sources being other light sources among the plurality of light sources than the first light source.

13. The light emitting apparatus according to claim 10, wherein:

the storage unit stores an initial control value of each of the plurality of light sources, which is the light emission control value previously determined for each of the light sources so that a dispersion of the brightness in a light emission plane of the light emitting apparatus is within a predetermined allowable level; and in a case where the detecting unit detects the malfunction of the brightness sensor, the control unit controls the light emission control values of respective light sources to the initial control values of the respective light sources of which the brightness sensor detects brightnesses.

14. The light emitting apparatus according to claim 10, wherein:

each of the light sources is a white light source composed of light emitting elements of a plurality of colors for which light emission is controllable independently from each other;

the storage unit stores an initial control value of each of the plurality of light emitting elements, which is the light emission control value previously determined for each of the light emitting elements so that a dispersion of the brightness in a light emission plane of the light emitting apparatus is within a predetermined allowable level; and the detecting unit is configured to detect any malfunction of the light emitting element for constructing each of the white light sources, wherein in a case where the malfunction of at least one of the light emitting elements is detected, the control unit determines the light emission control values of the light emitting elements of a white light source which includes the malfunctioning light emitting element to zero, and the light emission control values of the light emitting elements of the other white light sources to the initial control values.

15. The light emitting apparatus according to claim 10, wherein:

the storage unit stores the light emission control value of each of the plurality of light sources determined by the control unit; and the control unit determines the light emission control values of light sources other than the malfunctioning light source to be set to the light emission control values determined by the control unit before the malfunction is detected if the malfunction is detected.

16. The light emitting apparatus according to claim 10, wherein:

each of the plurality of light sources emits light based on the light emission control value of each of the plurality of light sources.

17. The light emitting apparatus according to claim 10, wherein:

the brightness sensor outputs an output value according to the detected brightness;

the malfunction is detected in a case that the output value is not within a predetermined range.

18. The light emitting apparatus according to claim 10, wherein the light emitting apparatus is a backlight apparatus of a liquid crystal display.

* * * * *